(12) United States Patent
Ozaki

(10) Patent No.: US 10,848,486 B2
(45) Date of Patent: Nov. 24, 2020

(54) SYSTEM AND METHOD

(71) Applicant: CANON KABUSHIKI KAISHA, Tokyo (JP)

(72) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 15/877,197

(22) Filed: Jan. 22, 2018

(65) Prior Publication Data

US 2018/0212961 A1  Jul. 26, 2018

(30) Foreign Application Priority Data

Jan. 24, 2017 (JP) ................................ 2017-010749

(51) Int. Cl.
*H04L 9/32* (2006.01)
*H04L 29/06* (2006.01)
*G06K 9/00* (2006.01)
*H04L 9/08* (2006.01)

(52) U.S. Cl.
CPC ...... *H04L 63/0861* (2013.01); *G06K 9/00006* (2013.01); *G06K 9/00087* (2013.01); *G06K 9/00221* (2013.01); *G06K 9/00288* (2013.01); *G06K 9/00597* (2013.01); *G06K 9/00617* (2013.01); *H04L 9/0866* (2013.01); *H04L 9/3231* (2013.01); *H04L 63/0884* (2013.01); *H04L 2209/76* (2013.01)

(58) Field of Classification Search
CPC .................................................. H04L 63/0861
See application file for complete search history.

(56) References Cited

U.S. PATENT DOCUMENTS

| | | | | |
|---|---|---|---|---|
| 2002/0156906 A1* | 10/2002 | Kadyk | .................. | H04L 63/029 709/229 |
| 2006/0078177 A1* | 4/2006 | Niinuma | ............ | G06K 9/00087 382/124 |
| 2008/0216171 A1* | 9/2008 | Sano | ......................... | H04L 9/32 726/19 |
| 2011/0099385 A1* | 4/2011 | Takahashi | ........... | H04L 63/0861 713/186 |
| 2016/0364190 A1* | 12/2016 | Shirai | ................... | G06F 3/1238 |

FOREIGN PATENT DOCUMENTS

JP   2010-218291 A   9/2010

* cited by examiner

*Primary Examiner* — Josnel Jeudy
(74) *Attorney, Agent, or Firm* — Canon U.S.A., Inc. IP Division

(57) ABSTRACT

A system includes an authentication server that executes authentication processing via one or more biometric authentication methods. The system detects, in response to a request for proxy work, authentication target data related to biometric information from data acquired at a location where the request for the proxy work is issued. The system executes additional authentication processing, by comparing feature data of biometric information corresponding to a proxy executor included in proxy setting and the detected authentication target data. The system manages a status of the proxy work to be executed in a case where the additional authentication processing is successful.

18 Claims, 12 Drawing Sheets

FIG.6A

```
REGISTERED USER INFORMATION

UID: AAA ～604
PASSWORD: *** ～605
BIOMETRIC INFORMATION ～606
PERSONAL AUTHORITY INFORMATION
CONNECTION INFORMATION  607
```

```
REGISTERED USER INFORMATION

UID: BBB ～604
PASSWORD: *** ～605
BIOMETRIC INFORMATION ～606
PERSONAL AUTHORITY INFORMATION
CONNECTION INFORMATION  607
```

FIG.6B

```
AAA PROXY SETTING MENU

PROXY EXECUTOR      BBB       ～601
SELECTION           CCC
                    DDD
                    EEE

☐ TARGET
  APPARATUS: [                    ]
602
        ☐ FUNCTION A  ☐ FUNCTION B  ☐ FUNCTION C
        ☐ ....

☑ CONTENTS:  *CONFERENCE MATERIAL*.*
603
```

FIG.6C

```
PROXY SETTING INFORMATION

UID: AAA ～608
PROXY SETTING: BBB1 ～609
PROXY AUTHORITY INFORMATION ～610
REQUEST DESTINATION: BBB ～611
CONNECTION INFORMATION ～612
EXPIRATION DATE ～613
```

FIG.6D

```
PROXY STATUS

PROXY SETTING: BBB1 ～614
STATE: NON-EXECUTION ～615
EXECUTOR: ～616
```

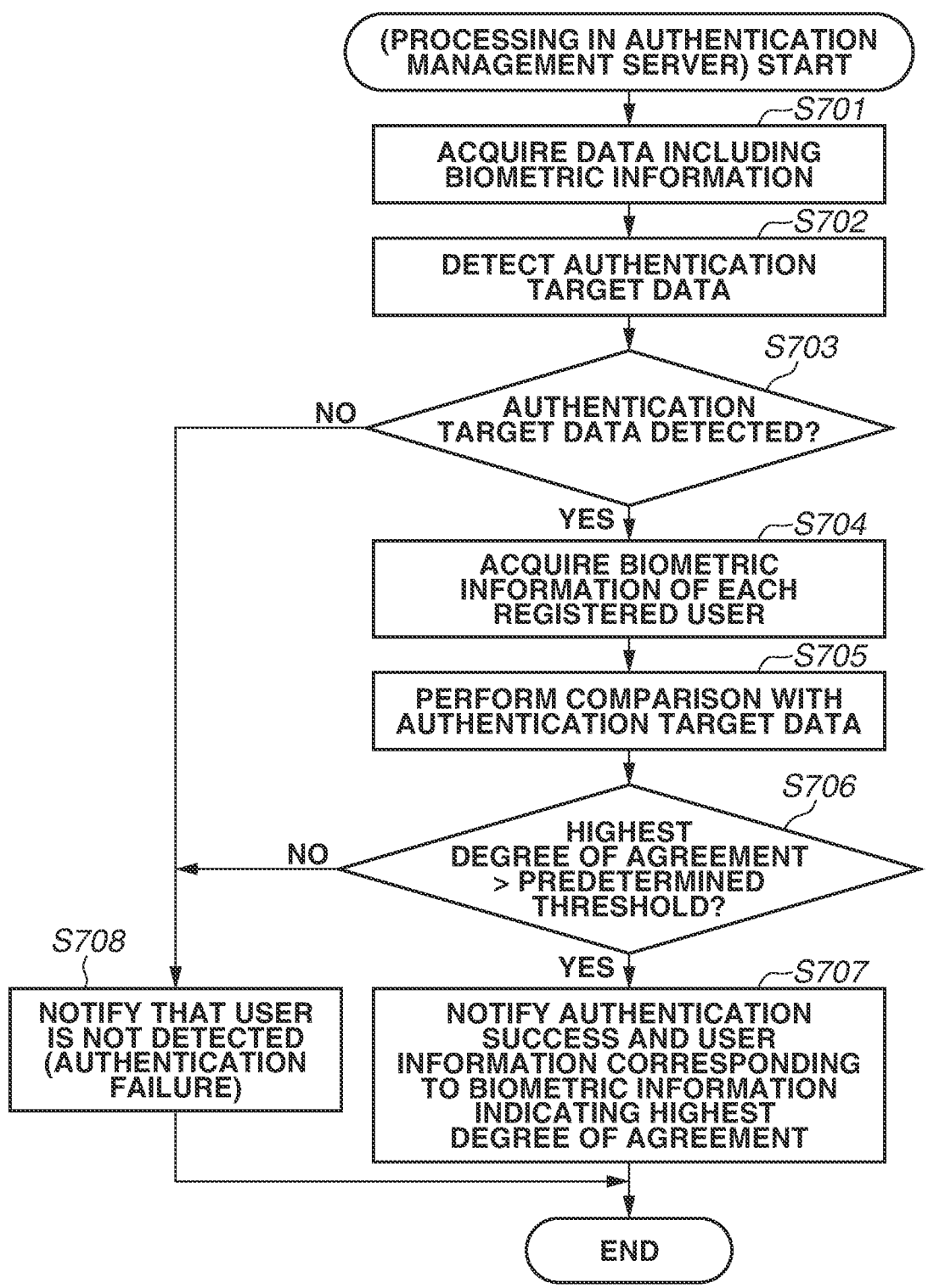

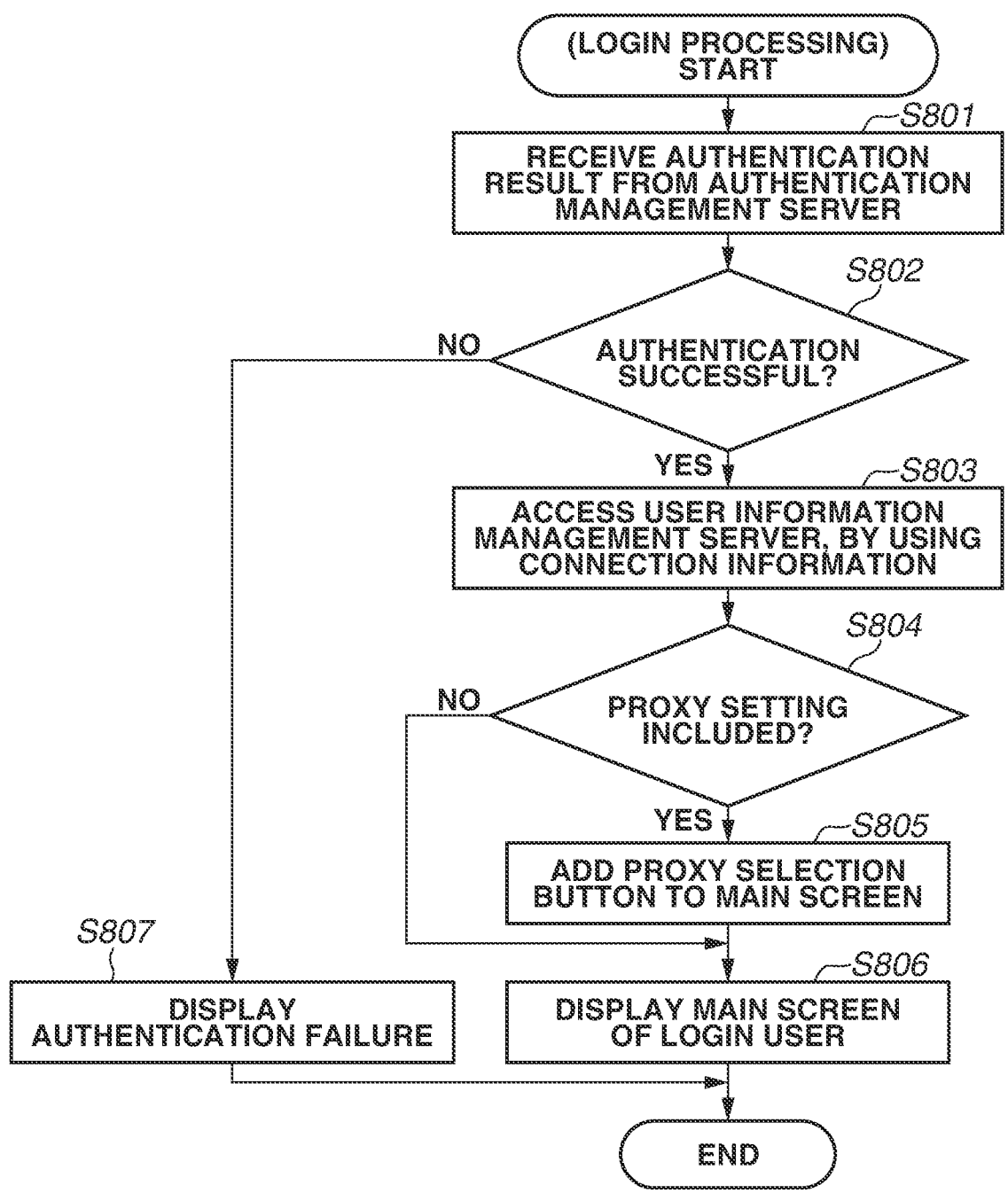

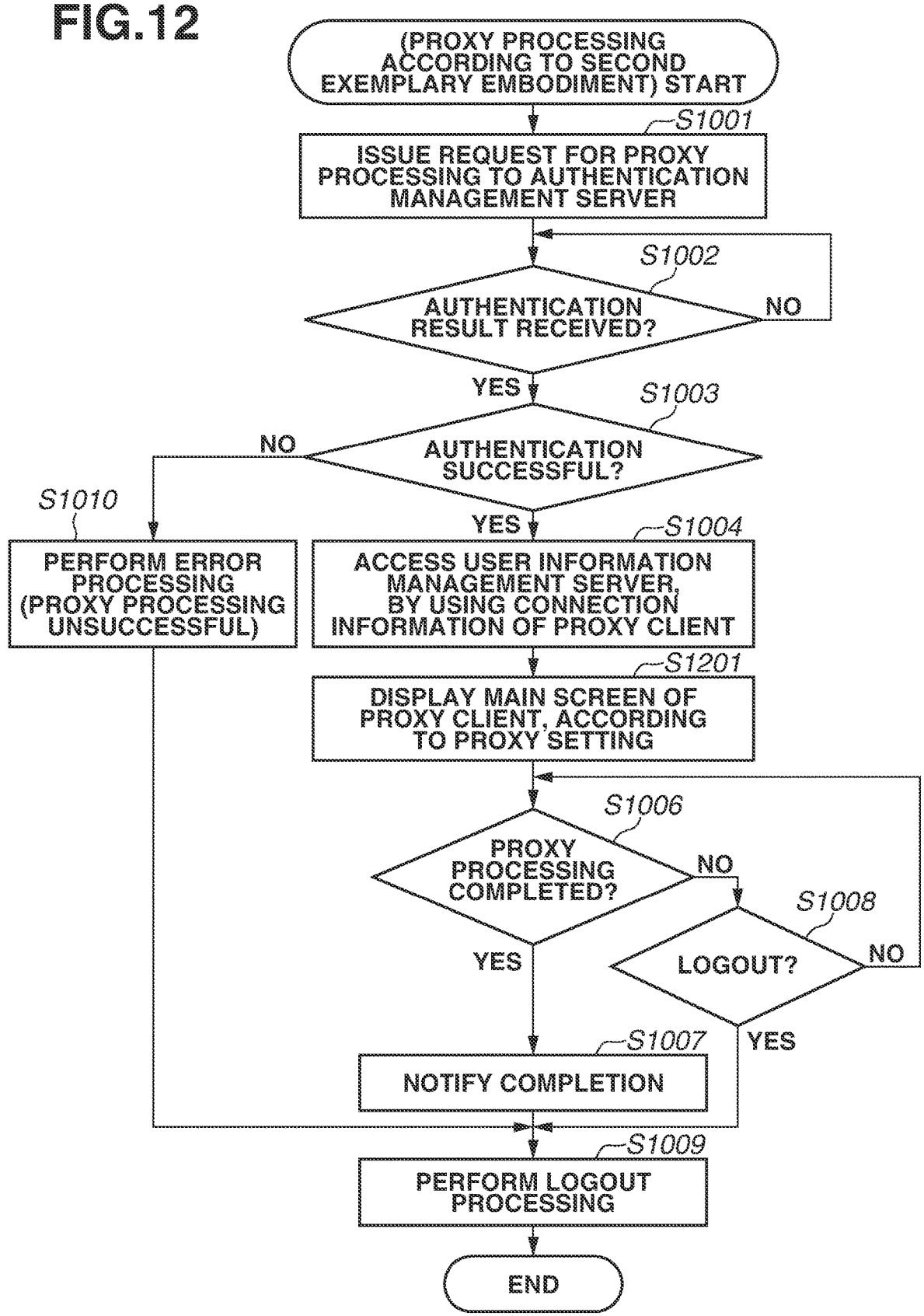

SYSTEM AND METHOD

BACKGROUND

Field

The present disclosure relates to a system that manages a login to an apparatus by biometric authentication employing a method such as face authentication using a network camera.

Description of the Related Art

In recent years, many apparatuses, including personal computers (PCs) and image forming apparatuses, such as printers and copiers, have been installed in various locations, such as an office. The range of uses of each of these apparatuses is controlled using a user authentication function. Specifically, one type of apparatus enables effects such as enabling/disabling individual functions. The individual functions include displaying an operation screen specific to a login user and printing for a logged-in user.

A password authentication method and a card authentication method are common as user authentication methods. According to the password authentication method, a user identification (ID) and a password are input to a local user interface (UI), such as an operation panel of an image forming apparatus. According to the card authentication method, a user logs in by holding a card over a card reader installed on an image forming apparatus. However, according to such authentication methods, any person can log in if that person obtains a user ID and a password or an IC card of a user, even if the person is not the user. Therefore, in recent years, biometric authentication for authenticating a user has started to become more widespread. Examples of biometric authentication include face authentication. In face authentication, personal identification is performed by extracting a face image from image data resulting from imaging by, for example, a network camera, and comparing the extracted face image with feature data of a registered face image.

Assume that the above-described authentication method using a user ID and a password or an IC card of a user is used. In this case, a person can perform work on behalf of a client with an apparatus of the client by logging into the apparatus with an ID and a password provided by the client, or with an IC card borrowed from the client. For example, the person can print a document that can be handled under the authority of the client on behalf of the client.

In a case where only a biometric authentication method is used for authentication in an apparatus, a biometric feature of a proxy is used. Therefore, there can arise an issue that the proxy cannot log into the apparatus as a proxy's client, and thus cannot perform proxy work. Japanese Patent Application Laid-Open No. 2010-218291 discuses a technique related to this issue. According to this technique, proxy authority for using a part of authority associated with a template corresponding to certain biometric information is provided beforehand to other template corresponding to other biometric information with an expiration date.

In a system premised on a biometric authentication method, a proxy performing proxy work can be requested to perform work by a plurality of clients on behalf of these clients, or can use an apparatus for work other than proxy work by using an account of the proxy. From the viewpoint of suppressing human errors and security risks, it is necessary for a worker to be able to work while distinguishing proxy work and other work, and it is necessary for each client to be able to understand the status of proxy work.

SUMMARY

According to an aspect of the present disclosure, a system includes an authentication service configured to execute authentication processing by one or more methods of biometric authentication, and the system further includes a memory storing instructions, and a processor which is capable of executing the instructions causing the system to set proxy setting information including identification information about a proxy's client, identification information of a user serving as the proxy executor, and a content of proxy work, detect, in response to a request for proxy work issued after success of first authentication processing using authentication target data detected from data including biometric information about the user, authentication target data related to biometric information from data acquired at a location where the request for the proxy work is issued, execute second authentication processing, by comparing feature data of biometric information corresponding to the proxy executor included in the set proxy setting information and the detected authentication target data, and manage a status of the proxy work to be executed in a case where the second authentication processing is successful.

Further features will become apparent from the following description of exemplary embodiments with reference to the attached drawings.

BRIEF DESCRIPTION OF THE DRAWINGS

FIGS. 6A to 6D illustrate examples of information and setting to be managed by the user information management server or the authentication management server.

FIG. 7 is a flowchart illustrating processing in the authentication management server.

FIG. 8 is a flowchart illustrating login processing to the image forming apparatus.

FIG. 12 is a flowchart illustrating proxy execution processing according to a second exemplary embodiment.

DESCRIPTION OF THE EMBODIMENTS

Exemplary embodiments will be described below with reference to the drawings.

Figure 1:
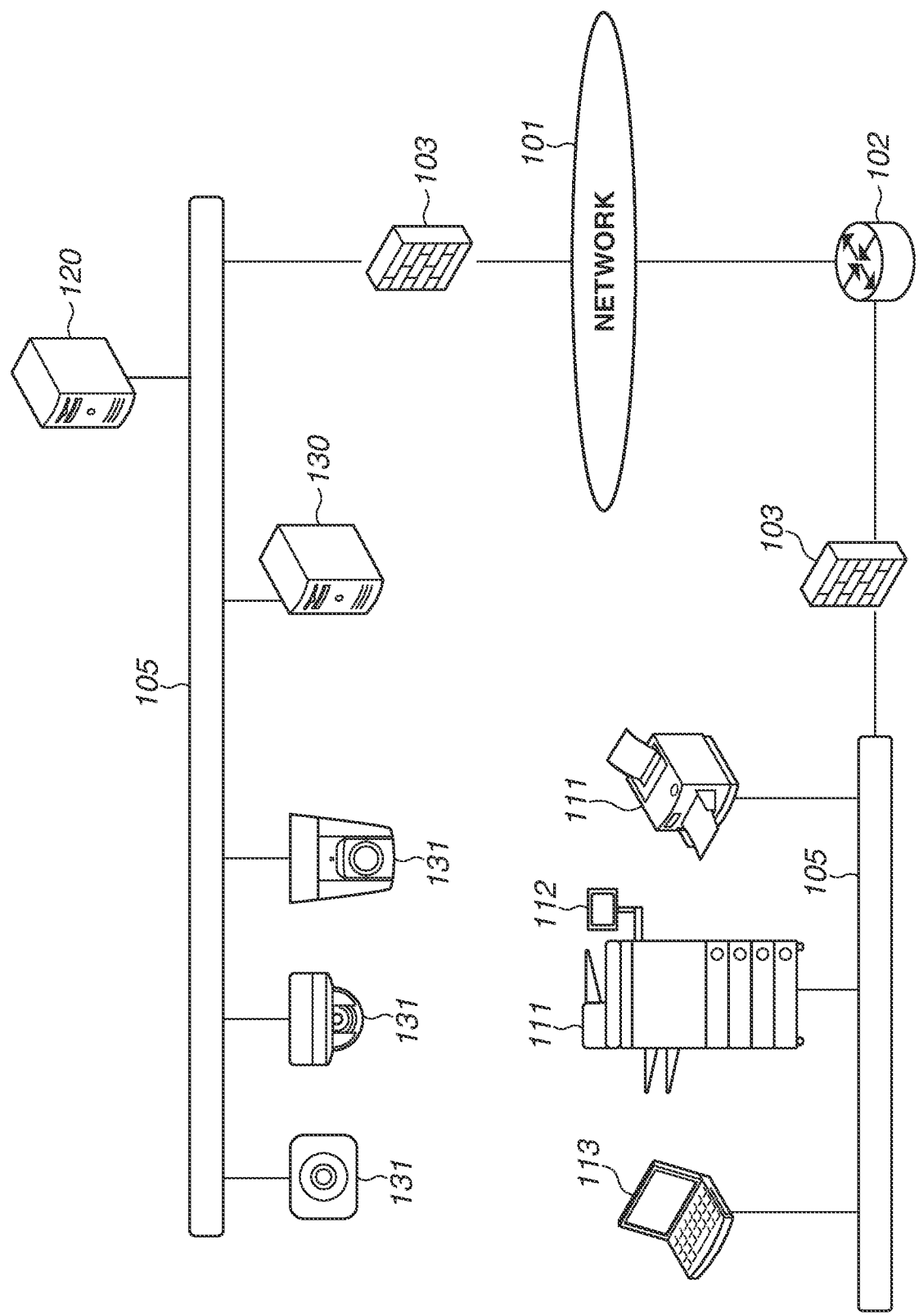
FIG. 1 is a diagram illustrating an example of a network configuration according to exemplary embodiments.

FIG. 1 illustrates an example of a network configuration according to an exemplary embodiment. A network 101 is the Internet or a network such as an intranet. A network device 102 is a device such as a router or a switch that provides connection to various networks. A firewall 103 provides communication permissions control between the networks. A local area network (LAN) 105 is an end network for connecting an apparatus, such as a computer. The LAN 105 is not limited to a wired communication network, and can be a wireless communication network, such as a wireless LAN or a portable telephone communication network.

An image forming apparatus 111 is an example of an apparatus used by each user who has succeeded in biometric authentication according to the present exemplary embodiment. Types of the image forming apparatus include a single function printer (SFP) with only a printer function and a multi-function printer (MFP) that is a multifunction machine with a plurality of functions including copier, scanner, and printer functions. An operation unit 112 is of a touch panel type and connected to the image forming apparatus 111. The operation unit 112, for example, enables setting for the image forming apparatus 111, and provides various kinds of information to a user.

Examples of the apparatus used by each user who has succeeded in biometric authentication according to the present exemplary embodiment include, in addition to the image forming apparatuses, various apparatuses including a personal computer and a three-dimensional printer for forming a three-dimensional object. Examples of the biometric authentication applicable to the present exemplary embodiment include face authentication. In face authentication, personal identification is performed by extracting a face image from image data resulting from imaging by, for example, a network camera, and comparing the extracted face image with feature data of a registered face image. Biometric authentication using other types of biometric feature of a person is also applicable. Examples of the other types of biometric feature include a fingerprint, a vein pattern, a voiceprint, and an iris. Besides a network camera 131 described below, devices such as a sensor and a microphone for supporting each authentication method are installed as attachments to an apparatus such as the image forming apparatus 111.

A client computer 113 is, for example, a computer used by a client who requests proxy work. The client computer 113 can be a computer used by a proxy. In other words, the client computer 113 is an example of an apparatus that provides a necessary function, by authenticating a user through biometric authentication. The client computer 113 can also output image data to the image forming apparatus 111 and acquire image data captured by the image forming apparatus 111, if a device driver is installed in the client computer 113. Any one of apparatuses including a personal computer, a tablet computer, and a smartphone is provided as the client computer 113.

A user information management server 120 manages, as user information, registration information about each user including user identification information, and information such as individual setting and a document file available for each user.

An authentication management server 130 detects a user near the image forming apparatus 111 based on information from the network camera 131 described below, and manages a login to the image forming apparatus 111. The authentication management server 130 also operates as a web server that provides a screen for a client who requests proxy work. The authentication management server 130 can be included in each apparatus that requires authentication for use of the apparatus.

Cameras of different types are provided as the network camera 131, including cameras of a cubic fixed type, of a pan-tilt type, and of a wide-angle type that vary in lens and motion mechanism. In the present exemplary embodiment, the network camera 131 is connected, as a single device, to the network 101, but can be incorporated as a part of the image forming apparatus 111.

Figure 2:
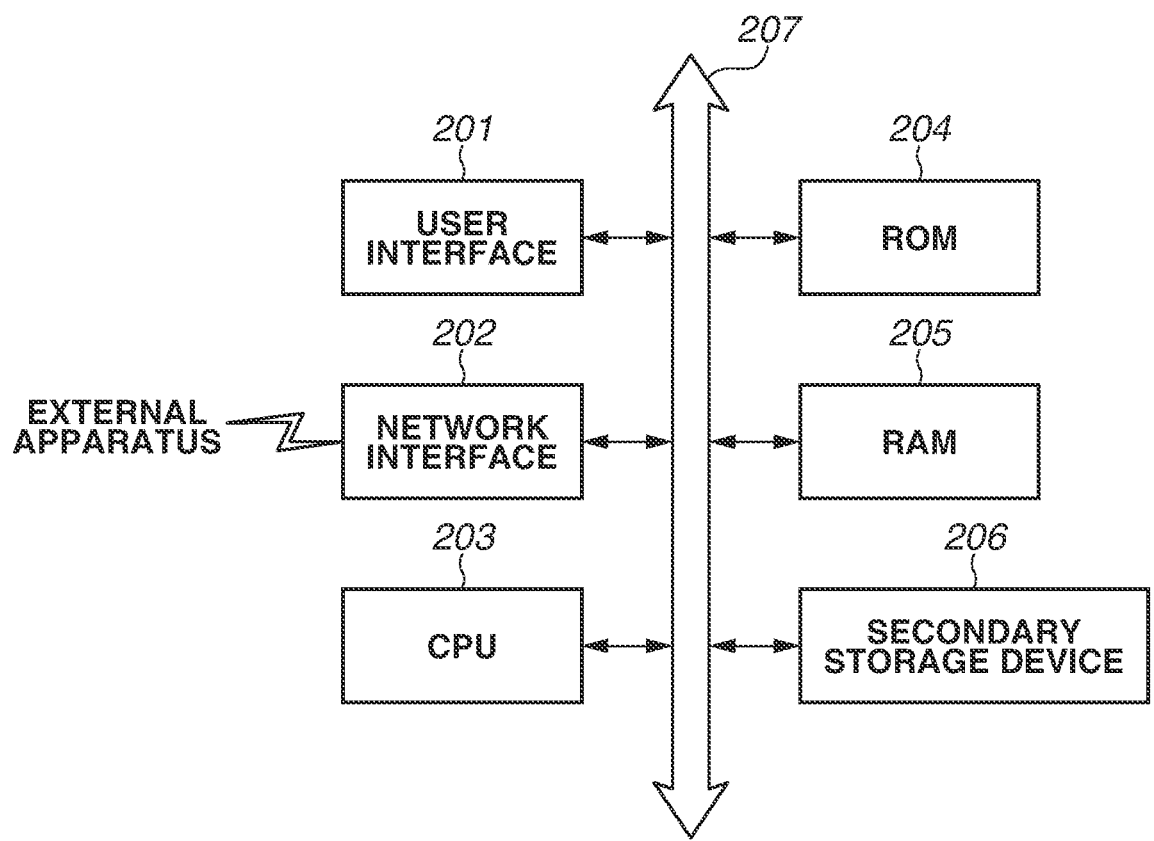
FIG. 2 is a diagram illustrating an example of a hardware configuration of an information processing apparatus.

FIG. 2 is a diagram illustrating an inner configuration of each of the information processing apparatuses. The information processing apparatuses include an apparatus with which work is to be performed, such as the image forming apparatus 111, the client computer 113, the authentication management server 130, and the user information management server 120.

A user interface 201 inputs and outputs information using hardware elements such as a display, a keyboard, a mouse, and a touch panel. An information processing apparatus without these hardware elements can be connected to and operated by other computers using a remote desktop or a remote shell. A network interface 202 is connected to a network such as a LAN, and communicates with other computers and network devices. A read only memory (ROM) 204 stores a preinstalled program and data. A random access memory (RAM) 205 is a temporary memory area. A secondary storage device 206 is a device represented by a hard disk drive (HDD). The secondary storage device 206 stores a program for implementing characteristic processing to be described below according to the present exemplary embodiment. A central processing unit (CPU) 203 executes programs read from devices such as the ROM 204, the RAM 205, and the secondary storage device 206. All units are connected via an input-output interface 207.

The image forming apparatus 111 also includes hardware elements such as an engine (not illustrated) for printing and a mechanism (not illustrated) for supplying a recording material. For example, in a case where a three-dimensional printer is used, the three-dimensional printer includes hardware elements such as a molding unit and a mechanism for supplying a molding material. The molding unit includes a molding head and a stage on which a layered three-dimensional object is to be formed.

Besides the network camera 131 described above, a sensor (not illustrated) for acquiring information from a user in the vicinity of the apparatus is provided as the apparatus with which work is to be performed according to the present exemplary embodiment. The information is one or more of a fingerprint, a vein pattern, a voiceprint, and an iris for implementing biometric authentication.

Figure 3:
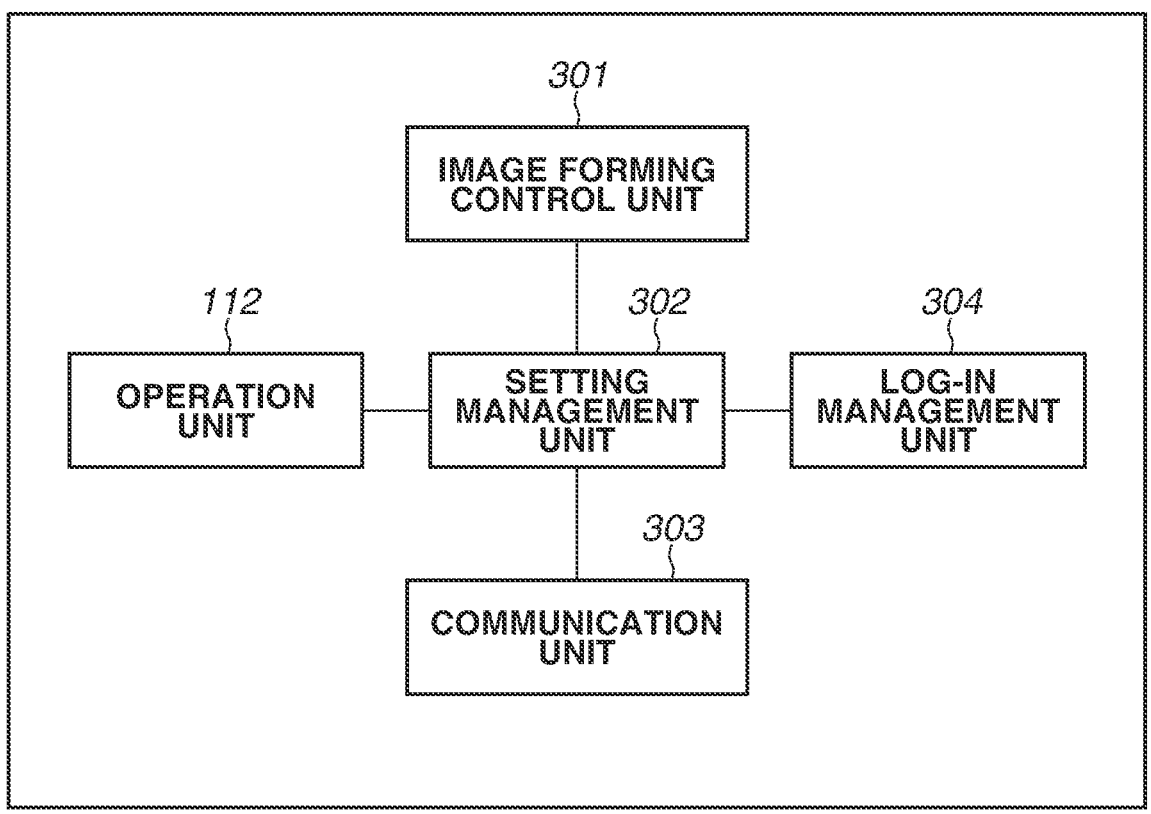
FIG. 3 is a diagram illustrating an example of a module configuration of software of an image forming apparatus.

FIG. 3 is a diagram illustrating an example of a module configuration of software of the image forming apparatus 111 according to the present exemplary embodiment.

The operation unit 112 receives inputs from input devices such as hardware keys and a touch panel serving as the user interface 201. For example, according to a received input, the operation unit 112 performs setting, issues an operation instruction for the image forming apparatus 111, and provides information to a user.

An image forming control unit 301 controls processing such as image formation and print output in an engine (not illustrated) that performs image formation and printing. A setting management unit 302 manages setting information about the image forming apparatus 111. The setting information includes information set through the operation unit 112 of the image forming apparatus 111, information predefined in a program, and information set from outside via a communication unit 303. The setting management unit 302 controls a content displayed on the touch panel of the operation unit 112 based on the setting information. Specifically, for example, contents (such as masking some of functions and reflecting individual customization) varying according to each logged-in user are displayed. The setting information also includes setting for access control, such as deciding an area that can be referred to in the secondary storage device 206 based on the authority of a logged-in user. The communication unit 303 controls communication via the network interface 202. A log-in management unit 304 manages the current login status of the image forming apparatus 111. In the present exemplary embodiment, a user who has successfully completed biometric authentication can log in as the user themselves or as a client requesting the user to perform work on behalf of the client.

Figure 4:
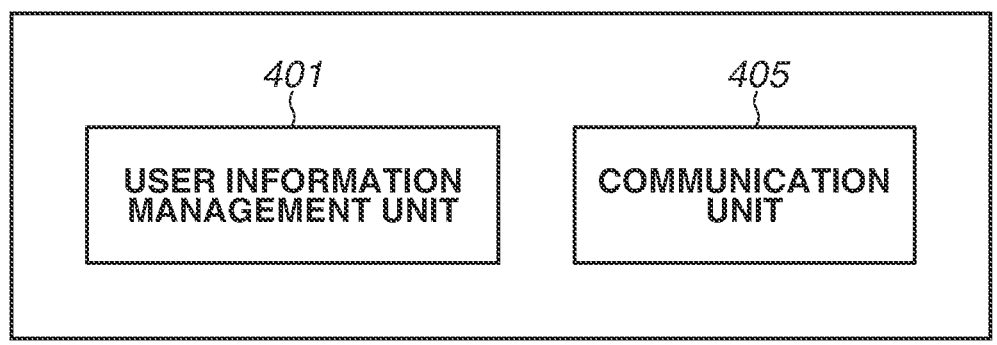
FIG. 4 is a diagram illustrating an example of a module configuration of software of a user information management server.

FIG. 4 is a diagram illustrating an example of a module configuration of software of the user information management server 120 according to the present exemplary embodiment.

A user information management unit 401 manages user information by using the secondary storage device 206. A communication unit 405 controls communication using the network interface 202. Assume that a request for registration of user information is received via the communication unit 405. The user information management unit 401 then registers necessary information, such as user identification information, a password for registration, biometric information for authentication, authority information, and individual setting, as new information, stores the necessary information in the secondary storage device 206, and manages the stored information. In a case where a request for acquiring user information is received via the communication unit 405, the user information management unit 401 provides the requested information. Such a request can be issued from the authentication management server 130, the image forming apparatus 111, or other servers (not illustrated).

Figure 5:
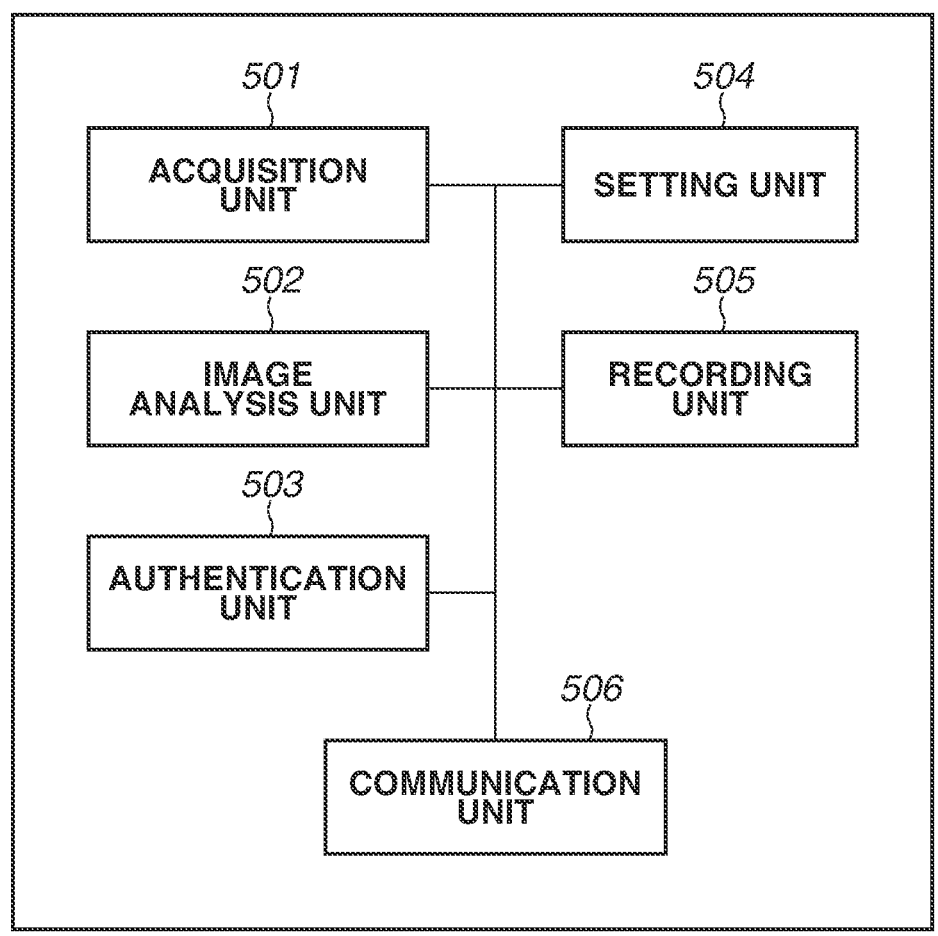
FIG. 5 is a diagram illustrating an example of a module configuration of software of an authentication management server.

FIG. 5 is a diagram illustrating an example of a module configuration of software of the authentication management server 130 according to the present exemplary embodiment. Modules in this configuration are implemented by a software program for authentication processing performed by the authentication management server 130. The software program is stored in the ROM 204 or the secondary storage device 206. The software program is read into the RAM 205 to be executed by the CPU 203.

An acquisition unit 501 acquires image data resulting from imaging by the network camera 131 via a communication unit 506. In a case where the authentication processing is performed using a voiceprint, the acquisition unit 501 acquires audio data via the communication unit 506. The audio data is obtained by prompting a user to speak a predetermined word toward a microphone (not illustrated) attached to an apparatus that the user wants to use.

An image analysis unit 502 analyzes the image data acquired by the acquisition unit 501. Specifically, the image analysis unit 502 detects image data (e.g., face image data), as authentication target data. This image data can be a biometric authentication target within image data of an image captured in the vicinity of an apparatus for which authentication is necessary, such as the image forming apparatus 111. A recording unit 505 records the authentication target data detected by the image analysis unit 502 in the secondary storage device 206, together with time information, such as a shooting time and a detection time. In a case where the acquisition unit 501 acquires audio data, the recording unit 505 also records the audio data into the secondary storage device 206 as the authentication target data.

An authentication unit 503 performs authentication processing by making a determination based on a comparison between the authentication target data recorded in the recording unit 505 and feature data of biometric information included in user information about a registered user. The user information can be managed in the authentication management server 130 or can be acquired from the user information management server 120 via the acquisition unit 501. The authentication unit 503 performs the following processing as the authentication processing. Specifically, the authentication unit 503 determines the degree of agreement between a feature point included in the authentication target data and feature data of biometric information about each registered user. The authentication unit 503 identifies feature data having the degree of agreement exceeding a predetermined threshold as well as being the highest degree of agreement. As a result, the authentication unit 503 determines that the authentication processing is successful for a user corresponding to the user information including the identified feature data. In a case where the authentication target data is audio data, the authentication unit 503 also performs determination using the degree of agreement with feature data as the authentication processing.

The authentication unit 503 executes authentication processing employing various authentication methods, such as methods using a face image, a fingerprint, a vein pattern, a voiceprint, and an iris. According to each of the authentication methods, the authentication processing can be performed at different authentication levels using a plurality of thresholds. For example, in the use of an apparatus with a low security risk, it is possible to perform threshold setting for authentication that becomes successful relatively more easily than authentication in other apparatuses. In a case where it is necessary to perform authentication a plurality of times in the same apparatus, the threshold setting to be used for each authentication can be changed beforehand based on a condition.

A setting unit 504 provides, to an external apparatus, a setting screen for implementing detailed setting. The detailed setting includes an authentication method and an authentication level to be used by the authentication unit 503. The setting unit 504 can also provide a setting screen for receiving proxy setting from a proxy's client to an external apparatus via a network.

FIGS. 6A to 6D illustrate examples of information or setting to be managed in the user information management server 120 or the authentication management server 130.

FIG. 6A illustrates examples of registered user information. This information is managed in the user information management server 120 as a part of user information. Similar information can be managed in the authentication management server 130.

User identification (UID) information 604 uniquely distinguishes each user. A password 605 corresponds to UID necessary in user information registration. Biometric information 606 is used to determine a user corresponding to UID. In the present exemplary embodiment, this biometric information is used for the authentication processing. Information corresponding to each of adoptable authentication methods is managed as the biometric information. Specifically, in a case where face authentication is performed, feature data indicating face images in various directions of a user corresponding to UID is managed. In each of the authentication methods using features such as a fingerprint, a vein pattern, a voiceprint, and an iris, necessary feature data is managed as the biometric information.

Personal authority information 607 is used for management of authority information about a user themselves corresponding to UID. Specifically, information, such as a list of functions available when a login to the image forming apparatus 111 is successful and a customized display content, is registered.

FIG. 6B illustrates a setting screen for proxy setting provided by the authentication management server 130. This screen is illustrated using, as an example, a case where a user corresponding to UID="AAA" performs setting at the client computer 113 as a proxy's client. The user AAA can use this screen, by logging in for a proxy request service to be provided by the authentication management server 130 through authentication such as biometric authentication or password authentication.

In the illustrated screen, UID="BBB" is selected in a box 601 as a proxy who is to perform work. On this setting screen, use of apparatuses with which proxy work is to be performed can be restricted, and an apparatus with which proxy work is to be performed can be selected by checking (activating) a check box 602. In this case, the setting screen also provides check boxes for placing an additional restriction on functions usable by a proxy executor with each apparatus. Contents that can be handled by the proxy executor during the proxy work can be limited by checking a check box 603. Here, in FIG. 6B, a limitation is set such that only contents having a character string "conference material" included in a file name can be handled. A plurality of proxies can be specified in the box 601.

A job specifying all of functions, detailed setting, and target contents to be used for proxy work can be registered as the proxy setting in place of proxy authority information. In this case, a proxy executor can immediately execute proxy work by selecting the job with an apparatus with which the proxy work is to be performed when performing the proxy work.

FIG. 6C illustrates an example of proxy setting information to be managed in the authentication management server 130. This example includes the information set in the setting screen illustrated in FIG. 6B. Specifically, UID 608 indicates UID of a proxy's client. Proxy setting 609 indicates a set ID (such as a set name) for uniquely identifying proxy setting.

As proxy authority information 610, proxy authority to be provided to a proxy executor is set. For example, this reflects the information set by activating the check box 602 and/or the check box 603 on the setting screen illustrated in FIG. 6B. A request destination 611 indicates UID of a proxy executor to be requested to act as a proxy. Connection information 612 is, for example, an authentication token for executing processing with this account, and a refresh token for acquiring an access token. This is connection information corresponding to the proxy's client. An expiration date 613 indicates a period during which this proxy setting information is valid. This period may be set by the proxy's client or a predetermined period can be automatically set. Alternatively, no expiration date can be set.

The authentication management server 130 can manage a plurality of proxy settings from a single proxy's client. The authentication management server 130 can also manage a plurality of proxy settings from one or more proxy's clients for a single proxy.

FIG. 6D illustrates status information for managing the progress status of proxy work corresponding to proxy setting managed in the authentication management server 130.

Proxy setting 614 includes the name of proxy setting. For a state 615, the progress of proxy work indicated by the proxy setting 614 is recorded. Specifically, any one of non-execution, in-processing, processing completion, error, and expiration states is recorded. For an executor 616, UID of a proxy who performs processing corresponding to this setting is recorded. In a case where the state is changed (in a case where completion of processing, an error, or expiration occurs), a notification about the changed state is sent using an e-mail to an e-mail address of a proxy's client, together with information indicating a part or all of proxy setting information.

The authentication management server 130 provides information indicating the status of proxy processing recorded in FIG. 6D by using a portal screen of the proxy's client.

FIG. 7 is a flowchart illustrating processing of detecting authentication target data and authentication processing in the authentication management server 130. The CPU 203 of the authentication management server 130 executes a software program for processing such as authentication processing, thereby implementing the present processing. Each step will be described using one of the modules illustrated in FIG. 5 as a subject. The present processing is executed in a case where image data or audio data including biometric information is acquired by execution of login operation by a user to the image forming apparatus 111, or by an approach of the user to the image forming apparatus 111.

In step S701, the acquisition unit 501 acquires data including biometric information detected at a location in the vicinity of the image forming apparatus 111. The data to be acquired here is data such as image data from the network camera 131 resulting from imaging of a user who has performed a login operation on the image forming apparatus 111, or audio data acquired by a microphone (not illustrated) of the image forming apparatus 111. Described in detail below is authentication processing using face image data, which is performed when image data is acquired from the network camera 131.

In step S702, the image analysis unit 502 detects authentication target data from the data acquired in step S701. Here, an area is divided, using a method such as pattern matching, into a person portion and other portion, and face image data is detected and extracted from the person portion. In a case where an authentication method employed in authentication processing at a subsequent stage uses data other than the face image data, the image analysis unit 502 attempts to find whether necessary authentication target data is detectable. In step S703, it is determined whether the authentication target data is detected by the image analysis unit 502. If the authentication target data is detected (YES in step S703), the processing proceeds to step S704. If the authentication target data is not detected (NO in step S703), the processing proceeds to step S708.

In step S704, the authentication unit 503 acquires biometric information managed as user information about each registered user. In a case where authentication processing using face image data is performed, feature data of the face image of a registered user is acquired. In step S705, the authentication unit 503 compares each piece of feature data acquired in step S704 and the authentication target data, thereby deciding each degree of agreement. In step S706, the authentication unit 503 performs the authentication processing, based on whether the highest degree of agreement among the degrees of agreement decided in step S705 exceeds a predetermined threshold. Here, if the highest degree of agreement exceeds the predetermined threshold (YES in step S706), the authentication is determined to be successful, and the processing proceeds to step S707. If the highest degree of agreement does not exceed the predetermined threshold (NO in step S706), the processing proceeds to step S708.

In step S707, the authentication unit 503 notifies the image forming apparatus 111 of the authentication success. In this case, the image forming apparatus 111 is notified of a part or all of the user information including the feature data decided to indicate the highest degree of agreement in step S705 together with the authentication success. In a case where proxy setting is managed for the user information of which the image forming apparatus 111 is to be notified, the image forming apparatus 111 is notified of proxy setting information together with the authentication success and the user information.

In step S708, the authentication unit 503 notifies the image forming apparatus 111 that no user is detected (an authentication failure).

FIG. 8 is a flowchart illustrating login processing in the image forming apparatus 111. The CPU 203 of the image forming apparatus 111 executes a software program according to the present processing, thereby implementing the present processing. Each step will be described using one of the modules illustrated in FIG. 5 as a subject.

In step S801, the communication unit 303 receives an authentication result from the authentication management server 130. This corresponds to the receipt of the notification in step S707 or S708 illustrated in FIG. 7.

In step S802, the log-in management unit 304 determines whether the authentication is successful by referring to the authentication result received in step S801. If the authentication is successful (YES in step S802), the processing proceeds to step S803. If the authentication fails (NO in step S802), the processing proceeds to step S807. In step S807, the operation unit 112 displays the authentication failure via the user interface 201.

In step S803, the log-in management unit 304 accesses the user information management server 120 via the communication unit 303 by using connection information included in the notification, which indicates the authentication success from the authentication management server 130. In this process, setting information, such as authority information and individual setting of UID corresponding to the user who has succeeded in authentication, is acquired from the user information management server 120.

In step S804, the log-in management unit 304 determines whether proxy setting is included in the notification indicating the authentication success from the authentication management server 130. If the proxy setting is included (YES in step S804), the processing proceeds to step S805. In step S805, a proxy selection button for ordering proxy work is added to a main screen that reflects setting information of UID corresponding to the user who has succeeded in authentication.

In step S806, the log-in management unit 304 instructs the operation unit 112 to display the main screen of the user (a logged-in user) who has succeeded in authentication. The operation unit 112 displays the main screen of the logged-in user via the user interface 201.

Figure 9A:
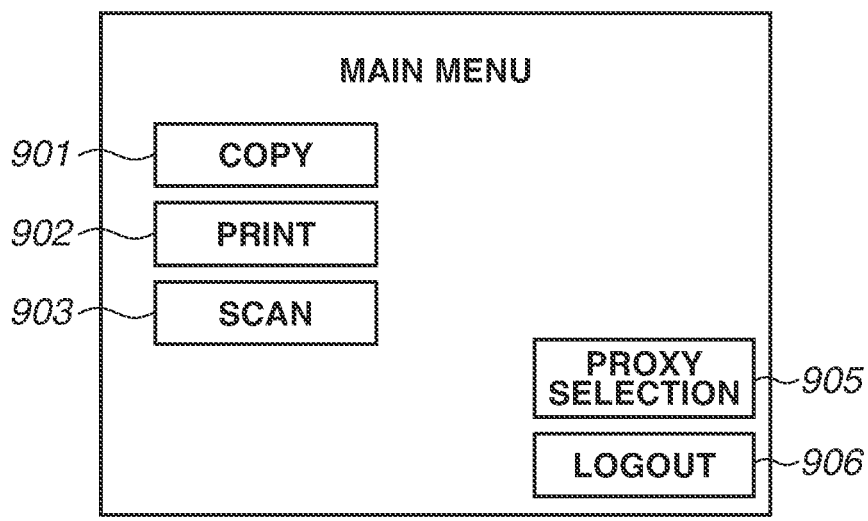
FIGS. 9A to 9C are diagrams each illustrating an example of a screen when a login is performed.

FIG. 9A illustrates an example of the main screen of the logged-in user. The main screen, which reflects the process of step S805, is displayed in step S806.

A copy button 901, a print button 902, and a scan button 903 are provided, corresponding to functions of the image forming apparatus 111 that are executable with the authority of the logged-in user. A proxy selection button 905 added in the process of step S805 is provided. A logout button 906 is also provided.

If the proxy setting is not present (NO in step S804, i.e., in a case where a user not requested to be a proxy logs in), the proxy selection button 905 is not provided.

Figure 9B:
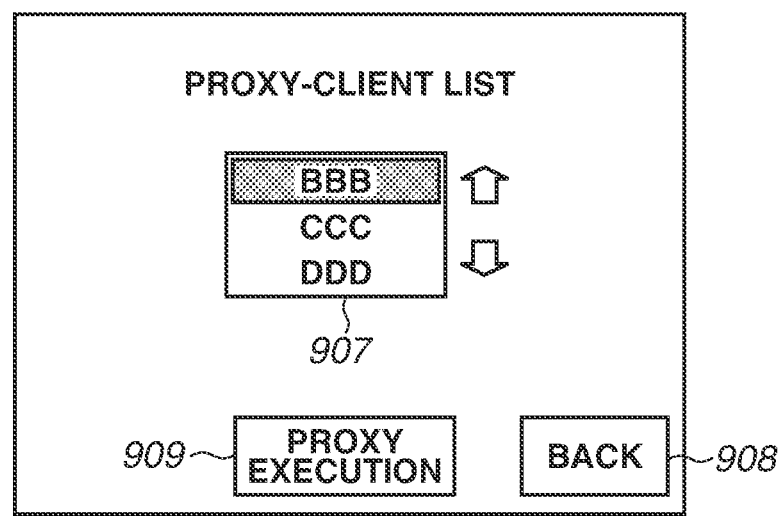

FIG. 9B is a screen displayed when the "proxy selection" button 905 is selected.

On this screen, a proxy's client can be selected from a proxy-client list 907. The proxy's client is confirmed by selection of a proxy execution button 909. When a back button 908 is selected, proxy processing ends and the user returns to the main screen in FIG. 9A.

Processing performed in a case where the proxy execution button 909 is selected on the screen illustrated in FIG. 9B will be described with reference to a flowchart illustrated in FIG. 10. The CPU 203 of the image forming apparatus 111 executes a software program according to the present processing, thereby implementing the present processing. Each step will be described using one of the modules illustrated in FIG. 5 as a subject.

In step S1001, the log-in management unit 304 issues a request for proxy processing to the authentication management server 130. This request includes user information (including user identification information) about the current logged-in user and user identification (UID) information corresponding to the proxy's client selected in FIG. 9B. A setting ID for identifying proxy setting can be included.

In step S1002, the log-in management unit 304 determines whether an authentication result is received from the authentication management server 130 via the communication unit 303, and waits until the authentication result is received. If the authentication result is received (YES in step S1002), the processing proceeds to step S1003.

In step S1003, the log-in management unit 304 determines whether the authentication is successful by referring to the received authentication result. If the authentication is successful (YES in step S1003), the processing proceeds to step S1004. If the authentication fails (NO in step S1003), the processing proceeds to step S1010. In step S1010, the operation unit 112 displays rejection of the request for the proxy processing, as error processing, via the user interface 201. A case leading to step S1010 is a situation where unauthorized proxy processing is attempted by a user different from a proxy executor specified in proxy setting. Specific examples include a case where the "proxy selection" button 905 is likely to be selected by a user different from the user who has succeeded in authentication in step S802, and a case where a user other than a proxy executor is in the vicinity of the image forming apparatus 111 when the "proxy selection" button 905 is selected.

In step S1004, the log-in management unit 304 accesses the user information management server 120 via the communication unit 303 by using the connection information about the proxy's client included in the notification indicating the authentication success from the authentication management server 130. In this process, setting information, such as the authority information and the individual setting of UID corresponding to the proxy's client, is acquired from the user information management server 120.

Figure 9C:
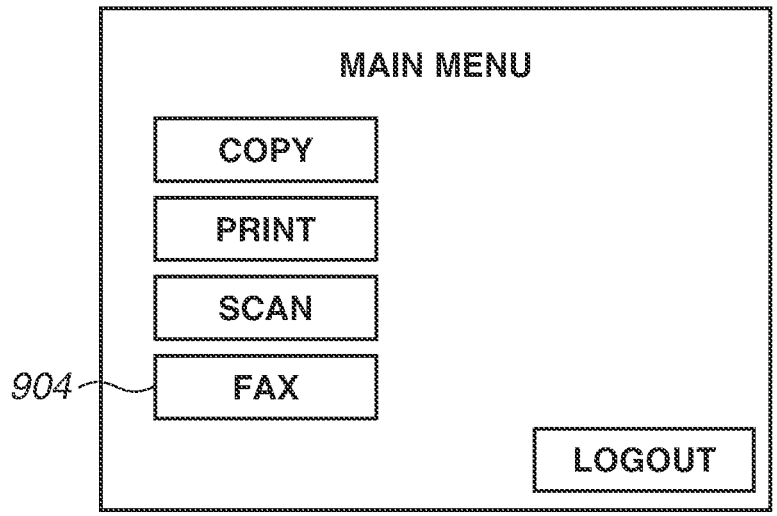

In step S1005, the log-in management unit 304 instructs the operation unit 112 to display a main screen based on proxy setting. The operation unit 112 displays the main screen via the user interface 201. FIG. 9C is an example of the screen displayed here. The screen in this example reflects the setting screen of the proxy's client, and the proxy authority information included in the proxy setting illustrated in FIG. 6C. Specifically, unlike the main screen (FIG. 9A) of the logged-in user, a fax button 904 for selecting a function for proxy work is provided. In addition, the proxy selection button 905 is not provided because proxy setting is not present.

In step S1006, the log-in management unit 304 determines whether the proxy processing executed using units including the operation unit 112, the communication unit 303, and the image forming control unit 301 is completed. If the proxy processing is completed (YES in step S1006), the processing proceeds to step S1007. If the proxy processing is not completed (NO in step S1006), the processing proceeds to step S1008. In step S1008, the log-in management unit 304 determines whether a logout button is selected on the screen illustrated in FIG. 9C. If the logout button is not selected (NO in step S1008), the determination process in step S1006 continues. If the logout button is selected (YES in step S1008), the processing proceeds to step S1009.

In step S1007, the log-in management unit 304 provides a notification indicating that the proxy processing is completed to the authentication management server 130 via the communication unit 303. As a result, in the authentication management server 130, information corresponding to the state and the executor of the proxy status illustrated in FIG. 6D is updated, and "processing completion" is recorded. The completion states about which a notification is to be provided by the log-in management unit 304 include an error exit. In a case where the proxy processing is completed by an error exit, the authentication management server 130 is notified of the error exit from the proxy processing in step S1007.

In step S1009, the log-in management unit 304 executes logout processing. In this logout processing, the user completely logs out as the logged-in user and as the proxy executor.

In the logout processing in step S1009, control can be performed such that the user logs out as the proxy executor and the main screen (FIG. 9A) of the login user is displayed on the operation unit 112.

Figure 10:
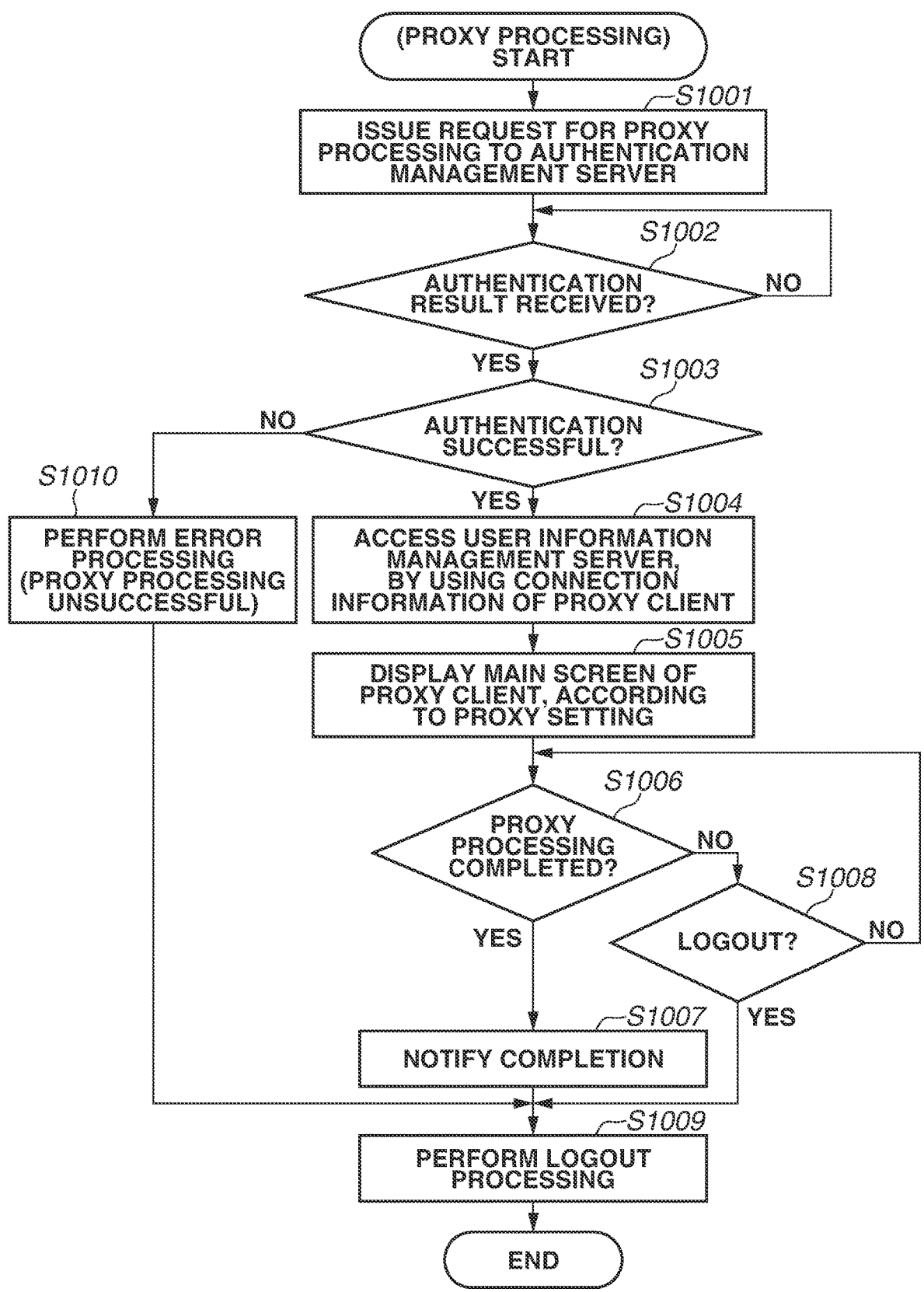
FIG. 10 is a flowchart illustrating proxy execution processing according to a first exemplary embodiment.
Figure 11:
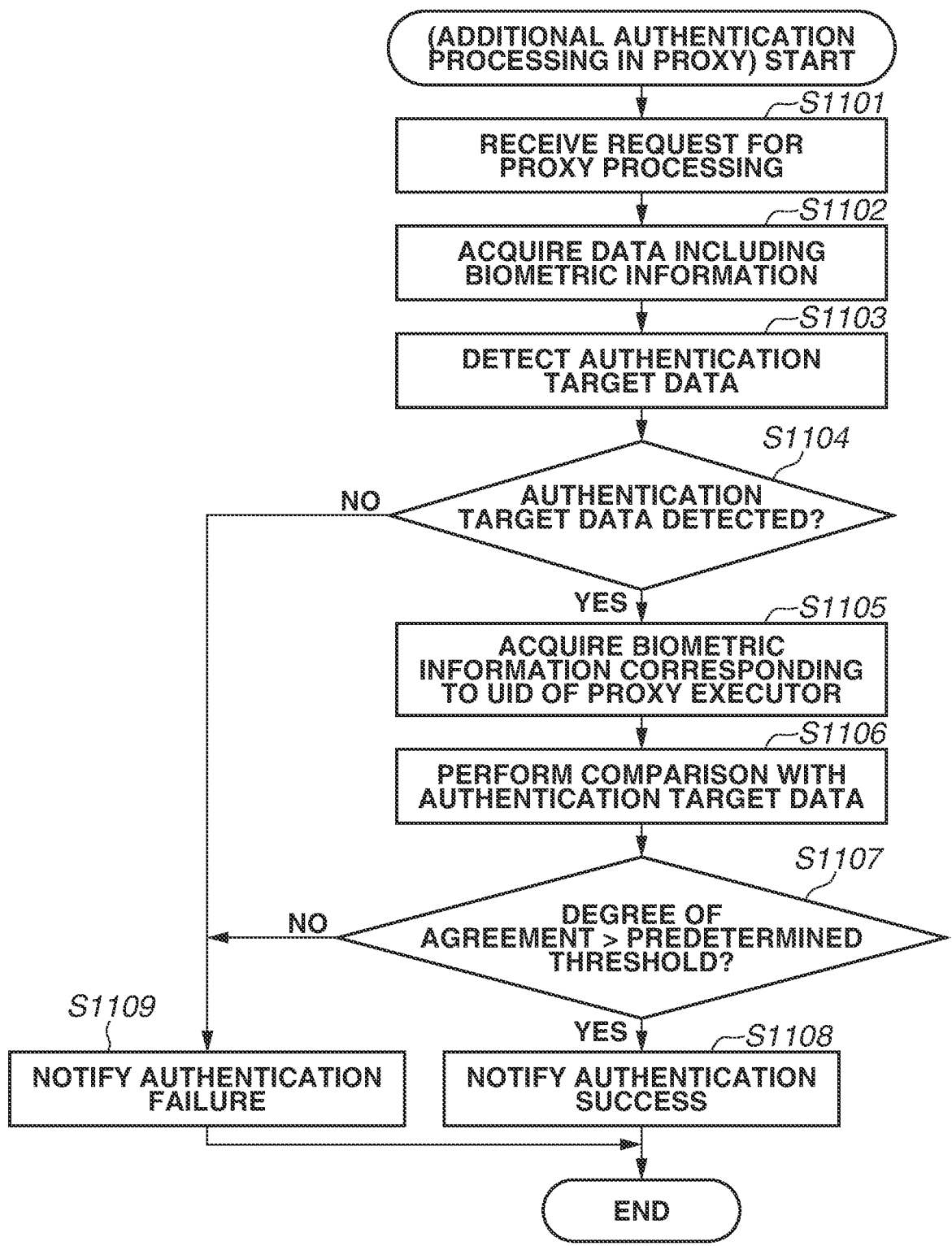
FIG. 11 is a flowchart illustrating processing in the authentication management server when proxy processing is requested.

FIG. 11 is a flowchart illustrating additional authentication processing in the authentication management server 130 receiving the request for the proxy processing in step S1001 of FIG. 10. The CPU 203 of the authentication management server 130 executes a software program for processing such as the authentication processing, thereby implementing the processing in this flowchart. Each step will be described using one of the modules illustrated in FIG. 5 as a subject.

In step S1101, the authentication unit 503 receives a request for proxy processing from the image forming apparatus 111 via the communication unit 506.

In step S1102 to step S1104, processes similar to the processes in step S701 to step S703 are executed. Here, when the "proxy selection" button 905 is selected in the image forming apparatus 111, processing is attempted for detecting authentication target data from data including biometric information detected at a location where an apparatus, such as an apparatus to be used based on the request for the proxy work, is installed. Examples of the location include a location in the vicinity of the image forming apparatus 111. If the detection of the authentication target data is successful in step S1104 (YES in step S1104), the processing proceeds to step S1105. If the detection of the authentication target data fails (NO in step S1104), the processing proceeds to step S1109.

In step S1105, the authentication unit 503 acquires biometric information corresponding to UID of a proxy executor specified in proxy setting corresponding to the request for the proxy processing. In step S1106, the authentication unit 503 decides a degree of agreement by comparing feature data in the biometric information acquired in step S1105 with the authentication target data. In step S1107, the authentication unit 503 performs authentication processing based on whether the degree of agreement decided in step S1106 exceeds a predetermined threshold. Here, if the degree of agreement exceeds the predetermined threshold (YES in step S1107), the authentication is determined to be successful, and the processing proceeds to step S1108. If the degree of agreement does not exceed the predetermined threshold (NO in step S1107), the processing proceeds to step S1109.

In step S1108, the authentication unit 503 notifies the image forming apparatus 111 of the authentication success. In this case, the authentication unit 503 notifies the image forming apparatus 111 of a part or all of the user information about a proxy's client together with the authentication success. In step S1109, the authentication unit 503 notifies the image forming apparatus 111 that a user serving as the proxy executor is not detected (an authentication failure).

Described above as a first exemplary embodiment is a method such that the proxy executor logs in as the proxy's client and performs the proxy work via the main screen of the proxy's client. In a second exemplary embodiment, a method will be described where a proxy executor can execute only proxy work by acquiring an access token of a proxy's client.

Processing unique to the second exemplary embodiment in a case where the proxy execution button 909 is selected on the screen illustrated in FIG. 9B will be described with reference to a flowchart illustrated in FIG. 12. Here, the description of processes similar to the processes in FIG. 10 will be omitted.

In step S1004, the log-in management unit 304 accesses the user information management server 120 via the communication unit 303 by using the connection information about a proxy's client included in a notification indicating an authentication success from the authentication management server 130. In this process, setting information, such as the authority information and the individual setting of UID corresponding to the proxy's client, is acquired from the user information management server 120. This process enables a proxy executor to acquire, as the authority information, an access token for executing proxy processing beyond the authority of the proxy executor. An upper limit to the number of times and an expiration date are set such that the access token can be used only once.

In step S1201, the log-in management unit 304 instructs the operation unit 112 to display a main screen based on proxy setting. The screen displayed here displays, for example, a job corresponding to proxy work set by the proxy's client as the proxy setting such that the job can be selected. The proxy executor can immediately start the proxy work by selecting this job. Even if the content of this job includes the content of work not executable with the normal authority of the proxy executor, this work is temporarily permitted by the access token acquired in step S1004. In a case where this proxy processing is completed, the access token is discarded.

In the first and second exemplary embodiments described above, the biometric authentication is performed at the time of login (in step S706) and during the proxy execution (in step S1107). However, these two kinds of authentication can use different thresholds for the degree of agreement of a person themselves in the authentication processing in the authentication management server 130.

The threshold to be used for the biometric authentication includes the following characteristics. If this threshold is high, the degree of agreement of the person themselves rises, and the probability of authenticating another person by mistake decreases. However, the probability of unsuccessfully authenticating the person themselves increases. If the threshold is low, the degree of agreement of the person themselves falls, and the probability of authenticating another person by mistake increases. However, the probability of authenticating the person themselves also increases.

For example, assume that the threshold used for the authentication processing during the proxy execution by the authentication management server 130 (in step S1107) is set to be higher than the threshold used for the authentication processing at the time of login (in step S706). In this case, when a user attempting to use an apparatus performs proxy work beyond the authority of the user themselves, the user can be identified with higher accuracy.

Besides changing the threshold, different types of biometric authentication can be appropriately used. Specifically, an authentication method based on face image data can be adopted for the authentication at the time of login (in step S706), and an authentication method based on a fingerprint can be adopted for the authentication during the proxy execution (in step S1107). The combination of authentication methods of biometric authentication can be different from this example. Therefore, when a user attempting to use an apparatus performs proxy work beyond the authority of the user themselves, the user can flexibly change the authentication method by selecting one or more methods from among authentication methods available for the biometric authentication of the apparatus.

A plurality of authentication methods can be adopted for one authentication. Specifically, an authentication method based on face image data can be adopted for the authentication at the time of login (in step S706), and an authentication method based on a voiceprint of audio data can be adopted for the authentication during the proxy execution (in step S1107), in addition to the authentication method based on face image data. The combination of authentication methods of biometric authentication can be different from this example.

Setting of these authentication methods can be freely performed on a screen (not illustrated) provided by the authentication management server 130. The authentication management server 130 manages this setting. A proxy's client can select an authentication method on the proxy setting screen illustrated in FIG. 6B.

In addition to the above-described first and second exemplary embodiments as well as application examples, a combination of authentication methods and a threshold for the degree of agreement of a person themselves can be set that vary based on an apparatus to be used. Robust biometric authentication can thereby be adopted for only a certain type of apparatus, such as an apparatus with a high security risk.

Setting of these authentication methods can be freely performed on a screen (not illustrated) provided by the authentication management server 130. The authentication management server 130 manages this setting. A proxy's client can select an authentication method on the proxy setting screen illustrated in FIG. 6B.

In the present exemplary embodiments, as an example of the apparatus available using the biometric authentication, the example of the image forming apparatus to which the biometric authentication is applied at the time of the proxy execution has been described. However, the present exemplary embodiments are each also applicable to other cases, such as a case where management and maintenance work requiring specific authority exceeding the authority of a person themselves can be performed as proxy work in an apparatus to be specially managed. Techniques, such as the registration of the proxy setting and the execution of the additional biometric authentication according to the present exemplary embodiments, are also applicable to other cases, such as a case where a user enters a specific area (a security zone) to perform proxy work, beyond an authentication area to which the user is admitted. The techniques are also applicable to occasions such as the time when a specific proxy job, such as withdrawal or transmission of money, is executed.

The present disclosure includes an apparatus or system configured by combining the above-described exemplary embodiments as appropriate and a method therefor.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-010749, filed Jan. 24, 2017, which is hereby incorporated by reference herein in its entirety.

What is claimed is:

1. A system including an authentication service configured to execute authentication processing via one or more biometric authentication methods, the system comprising:
   one or more memories storing instructions; and
   one or more processors executing the instructions causing the system to:
      set proxy setting information including identification information about a proxy's client, identification information about a user serving as a proxy executor, and a content of proxy work;

execute first authentication processing using authentication target data detected from data including biometric information about a user;

provide, in a case where the first authentication processing for the user is successful and the user is set as the proxy executor in the proxy setting information, information of the content for the authenticated user and information for a request for proxy work;

provide, in a case where the first authentication processing for the user is successful and the user is not set as the proxy executor in the proxy setting information, information of the content for the authenticated user;

detect, in response to the request for the proxy work issued based on the information for the request for the proxy work, authentication target data related to biometric information from data acquired at a location where the request for the proxy work is issued;

execute second authentication processing by comparing feature data of biometric information corresponding to the proxy executor included in the set proxy setting information and the detected authentication target data;

provide, in a case where the second authentication processing for the proxy work is successful, information of the content of the proxy work included in the proxy setting information; and manage a status of the proxy work.

2. The system according to claim 1,
wherein the second authentication processing uses a same method of biometric authentication as the first authentication processing, and
wherein a second threshold is a value higher than a first threshold, the first threshold used in the first authentication processing, and the second threshold compared with a degree of agreement obtained by comparing the feature data of the biometric information corresponding to the proxy executor included in the set proxy setting information and the detected authentication target data in the second authentication processing.

3. The system according to claim 1, wherein the second authentication processing uses a biometric authentication method different from a method used by the first authentication processing.

4. The system according to claim 1, wherein the second authentication processing uses a plurality of authentication methods including a biometric authentication method different from a method used by the first authentication processing.

5. The system according to claim 1, wherein the second authentication processing is executed to perform proxy work in one or more of an image forming apparatus, a personal computer, a three-dimensional printer for forming a three-dimensional object, and a specific security zone.

6. The system according to claim 1, wherein the proxy setting information includes, as the content of the proxy work, designation of one or more of an apparatus, a function, and a content, with which proxy work is to be performed.

7. The system according to claim 1, wherein the instructions further cause the system to manage the status of the proxy work based on a notification indicating completion of the proxy work from an apparatus serving as a transmission source of the request for the proxy work.

8. The system according to claim 1, wherein logout processing is executed in an apparatus serving as a transmission source of the request for the proxy work in a case where an authentication result indicating an authentication failure of the second authentication processing is received.

9. The system according to claim 1, wherein the authentication service is located in an apparatus serving as a transmission source of the request for the proxy work.

10. The system according to claim 1, wherein the authentication service executes one or more of face authentication, fingerprint authentication, vein authentication, voiceprint authentication, and iris authentication, as one or more biometric authentication methods.

11. A method in a system including an authentication service configured to execute authentication processing via one or more biometric authentication methods, the method comprising:

setting proxy setting information including identification information about a proxy's client, identification information about a user serving as a proxy executor, and a content of proxy work;

executing first authentication processing using authentication target data detected from data including biometric information about a user;

providing, in a case where the first authentication processing for the user is successful and the user is set as the proxy executor in the proxy setting information, information of the content for the authenticated user and information for a request for proxy work;

providing, in a case where the first authentication processing for the user is successful and the user is not set as the proxy executor in the proxy setting information, information of the content for the authenticated user;

detecting, in response to the request for the proxy work issued based on the information for the request for the proxy work, authentication target data related to biometric information from data acquired at a location where the request for the proxy work is issued;

executing second authentication processing by comparing feature data of biometric information corresponding to the proxy executor included in the set proxy setting information and the detected authentication target data;

providing, in a case where the second authentication processing for the proxy work is successful, information of the content of the proxy work included in the proxy setting information; and managing a status of the proxy work.

12. The method according to claim 11,
wherein the second authentication processing uses a same method of biometric authentication as the first authentication processing, and
wherein a second threshold is a value higher than a first threshold, the first threshold used in the first authentication processing, and the second threshold compared with a degree of agreement obtained by comparing the feature data of the biometric information corresponding to the proxy executor included in the set proxy setting information and the detected authentication target data in the second authentication processing.

13. The method according to claim 11, wherein the second authentication processing uses a biometric authentication method different from a method used by the first authentication processing.

14. The method according to claim 11, wherein the second authentication processing uses a plurality of authentication methods including a biometric authentication method different from a method used by the first authentication processing.

15. The method according to claim 11, wherein the status of the proxy work is managed based on a notification indicating completion of the proxy work from an apparatus serving as a transmission source of the request for the proxy work.

16. The method according to claim 11, wherein logout processing is executed in an apparatus serving as a transmission source of the request for the proxy work in a case where an authentication result indicating an authentication failure of the second authentication processing is received.

17. The method according to claim 11, wherein the authentication service is located in an apparatus serving as a transmission source of the request for the proxy work.

18. The method according to claim 11, wherein the authentication service executes one or more of face authentication, fingerprint authentication, vein authentication, voiceprint authentication, and iris authentication, as one or more biometric authentication methods.

* * * * *